United States Patent
Lawson et al.

(10) Patent No.: US 10,781,898 B2
(45) Date of Patent: Sep. 22, 2020

(54) MOTORIZED POSITIONING APPARATUS FOR A SEATING UNIT

(71) Applicant: L&P PROPERTY MANAGEMENT COMPANY, South Gate, CA (US)

(72) Inventors: Gregory Lawson, Tupelo, MS (US); Michael Crum, Mantachie, MS (US)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 0 days.

(21) Appl. No.: 15/834,888

(22) Filed: Dec. 7, 2017

(65) Prior Publication Data

US 2018/0094711 A1 Apr. 5, 2018

Related U.S. Application Data

(62) Division of application No. 15/075,153, filed on Mar. 19, 2016, now Pat. No. 9,845,852.

(60) Provisional application No. 62/136,413, filed on Mar. 20, 2015.

(51) Int. Cl.
   *A47C 1/0355* (2013.01)
   *F16H 25/20* (2006.01)

(52) U.S. Cl.
   CPC ........... *F16H 25/20* (2013.01); *A47C 1/0355* (2013.01); *F16H 2025/204* (2013.01)

(58) Field of Classification Search
   CPC ... F16H 25/20; F16H 2025/204; A47C 1/034; A47C 1/03211; A47C 1/0355
   See application file for complete search history.

(56) References Cited

U.S. PATENT DOCUMENTS

| | | | |
|---|---|---|---|
| 5,730,494 A * | 3/1998 | LaPointe | A61G 5/14 297/330 |
| 6,142,558 A | 11/2000 | May | |
| 6,840,575 B2 | 1/2005 | Hesse | |
| 7,585,018 B2 | 9/2009 | LaPointe et al. | |
| 7,641,277 B2 | 1/2010 | Lawson et al. | |
| 8,308,228 B2 | 11/2012 | Lawson et al. | |
| 8,398,165 B2 | 3/2013 | Lawson | |
| 9,113,712 B2 * | 8/2015 | Wittenberg, Jr. | A47C 1/03211 |

(Continued)

FOREIGN PATENT DOCUMENTS

| | | |
|---|---|---|
| CN | 1821620 A | 8/2006 |
| CN | 101511229 A | 8/2009 |

(Continued)

OTHER PUBLICATIONS

Extended Search Report dated Aug. 29, 2018 in European Patent Application No. 16769475.1, 9 pages.

(Continued)

*Primary Examiner* — Philip F Gabler
(74) *Attorney, Agent, or Firm* — Shook, Hardy & Bacon L.L.P.

(57) ABSTRACT

A motorized positioning apparatus for a seating unit includes a motor assembly that is configured to move a linkage assembly though a series of positions that arrange the seating unit in a closed position, open position, or extended position. The motor assembly attaches directly to a footrest drive link by way of a mounting tube. In addition, the motor assembly may attach either to a base rail of the seating unit or to a rear pivot link by way of a rear mounting tube.

6 Claims, 13 Drawing Sheets

(56) References Cited

U.S. PATENT DOCUMENTS

| | | |
|---|---|---|
| 10,066,717 B2 * | 9/2018 | Kristen .................. F16H 25/18 |
| 2001/0035668 A1 | 11/2001 | Gaffney et al. |
| 2011/0304193 A1 | 12/2011 | Murphy et al. |
| 2012/0286557 A1 | 11/2012 | Hoffman et al. |
| 2013/0175846 A1 | 7/2013 | Lawson |
| 2013/0234477 A1 | 9/2013 | Sichelschmidt |
| 2014/0035395 A1 | 2/2014 | Marcantoni |
| 2014/0049084 A1 | 2/2014 | Lawson et al. |
| 2015/0208805 A1 * | 7/2015 | Griggs, Jr. ........... A47C 1/0355 297/463.1 |
| 2015/0282619 A1 | 10/2015 | Lawson |
| 2016/0273632 A1 | 9/2016 | Lawson et al. |

FOREIGN PATENT DOCUMENTS

| | | |
|---|---|---|
| EP | 1092371 A1 | 4/2001 |
| EP | 102013106388 B3 | 10/2014 |
| EP | 2815681 A2 | 12/2014 |

OTHER PUBLICATIONS

Office Action received for Chinese Patent Application No. 201680016806.7, dated Feb. 3, 2020, 12 pages.

* cited by examiner

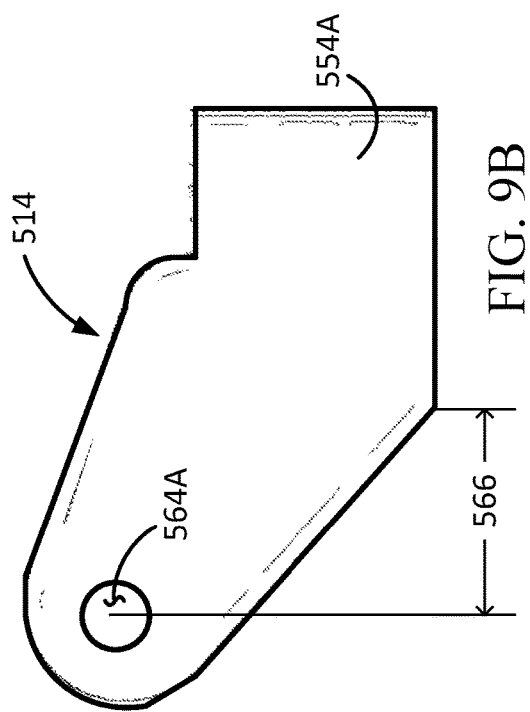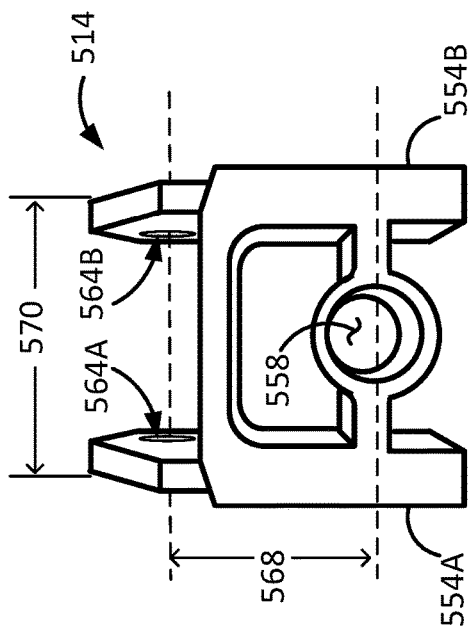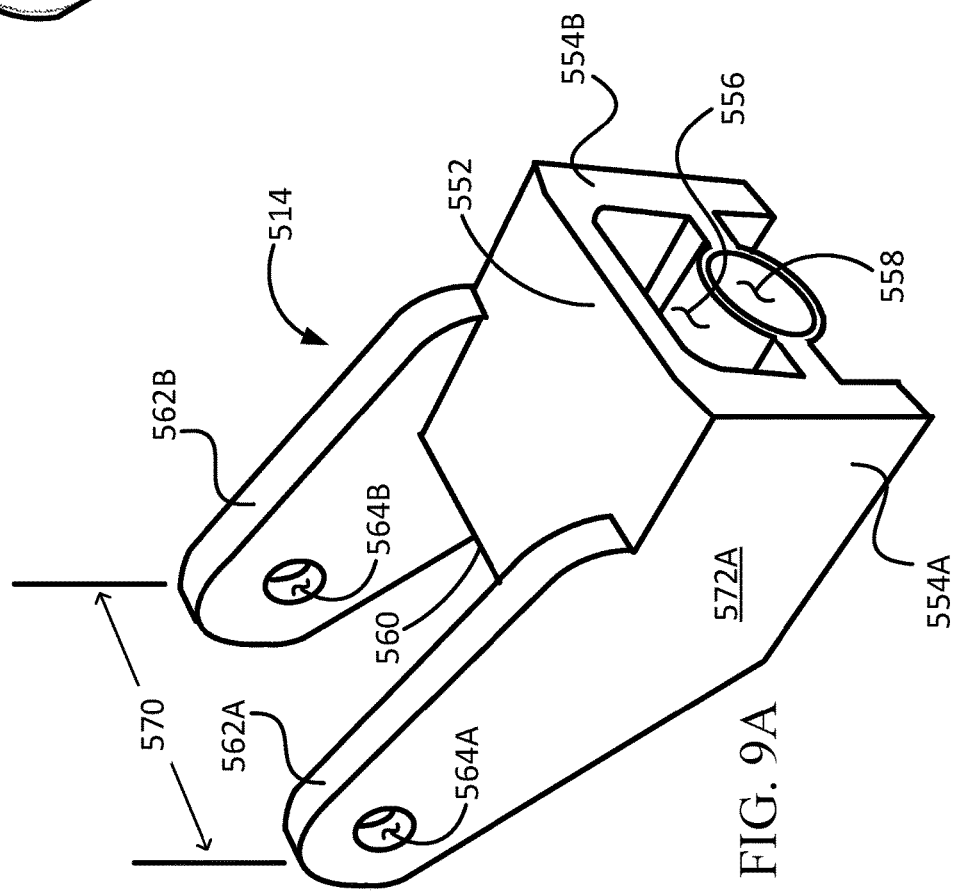

MOTORIZED POSITIONING APPARATUS FOR A SEATING UNIT

CROSS REFERENCE TO RELATED APPLICATIONS

This application is a divisional of U.S. patent application Ser. No. 15/075,153 (filed Mar. 19, 2016), which claims priority to U.S. Provisional Application No. 62/136,413 (filed on Mar. 20, 2015).

BACKGROUND

Furniture conventionally known as "zerowall" furniture are those articles of furniture, such as, for example, recliner chairs, wherein the rear portion of the chair can be disposed close to a wall of a room such that when the chair is to be moved from its original or normal closed or upright position, to its fully open reclined position, the entire body of the chair is moved forwardly so as to permit the seat back and the headrest portion of the chair to be inclined without necessarily coming into contact with, and thereby being obstructed in their movements from their original or normal closed or upright positions to their fully open reclined positions, by the wall.

Zerowall chairs may be manually operating or motorized. Nevertheless, adjusting the seating unit can create substantially large forces, stresses, and torques on the drive components. In addition, the chair components sometimes move (relative to the base rails) as the seating components, which can shift the balance of the chair and create some instability. Still further, the drive systems, defined between the drive motor and the components of the chair, often include relatively complex linkage arrangements.

SUMMARY

An aspect of the present disclosure includes a motorized positioning apparatus for a seating unit that adjusts relative to a base rail to a lesser extent than some previous mechanisms. In addition, the motorized positioning apparatus may produce smaller forces, torque, and stress than some previous devices and may include a simpler linkage mechanism.

In a further aspect, this disclosure describes a motorized positioning apparatus including a set of base rails and a pair of seat plates that are coupled to one another by a pair of substantially mirror-image linkage assemblies. Each linkage assembly includes a footrest-linkage assembly including a plurality of footrest linkages that extend and retract a footrest mounting bracket and that include a footrest actuating link coupled to a respective seat plate. The motorized positioning apparatus also includes footrest drive links pivotably coupled to the footrest actuating link of each linkage assembly. A front mounting tube is attached to both footrest drive links, and the front motor mounting tube may be driven using various motor assemblies, which may attach to a rear pivot link of the linkage assembly or may attach to a rear base rail.

Embodiments of the disclosure are defined by the claims below, not this summary. A high-level overview of various aspects of the disclosure is provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

BRIEF DESCRIPTION OF THE DRAWINGS

This disclosure includes various details that may reference the attached drawing figures, which are incorporated herein by reference, wherein:

FIGS. 9A through 9C depict various views of a drive block that is included in the mechanism depicted in FIGS. 6, 7, and 8, in accordance with an aspect of the present invention;

DETAILED DESCRIPTION

Subject matter is described throughout this disclosure in detail and with specificity in order to meet statutory requirements. But the aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This principle is contemplated by and is within the scope of the claims.

Overview of the Motorized Positioning Apparatus for a Seating Unit

This disclosure is generally directed to a motorized mechanism that operates to affect a position or arrangement of a seating unit. For example, the motorized mechanism may retain a seating unit in, or move the seating unit into, a closed position, an open position (also referred to as a TV position), and a reclined or extended position. In addition this disclosure describes various configurations in which the motor assembly (e.g., motor housing and linear actuator) may be attached to various portions of the seating unit. More specifically, this disclosure describes a motorized mechanism in which a drive block of motor assembly attaches to a front drive tube, which attaches to a footrest drive link. In addition, this disclosure describes alternative configurations in which a motor housing may attach to a rear base rail or to a rear drive tube attached to a rear pivot link. These various aspects, as well as the respective features thereof, will be described in more detail in the various portions of this disclosure.

Exemplary Aspect with Motor Assembly Mounted to Rear Mounting Tube

Figure 2:
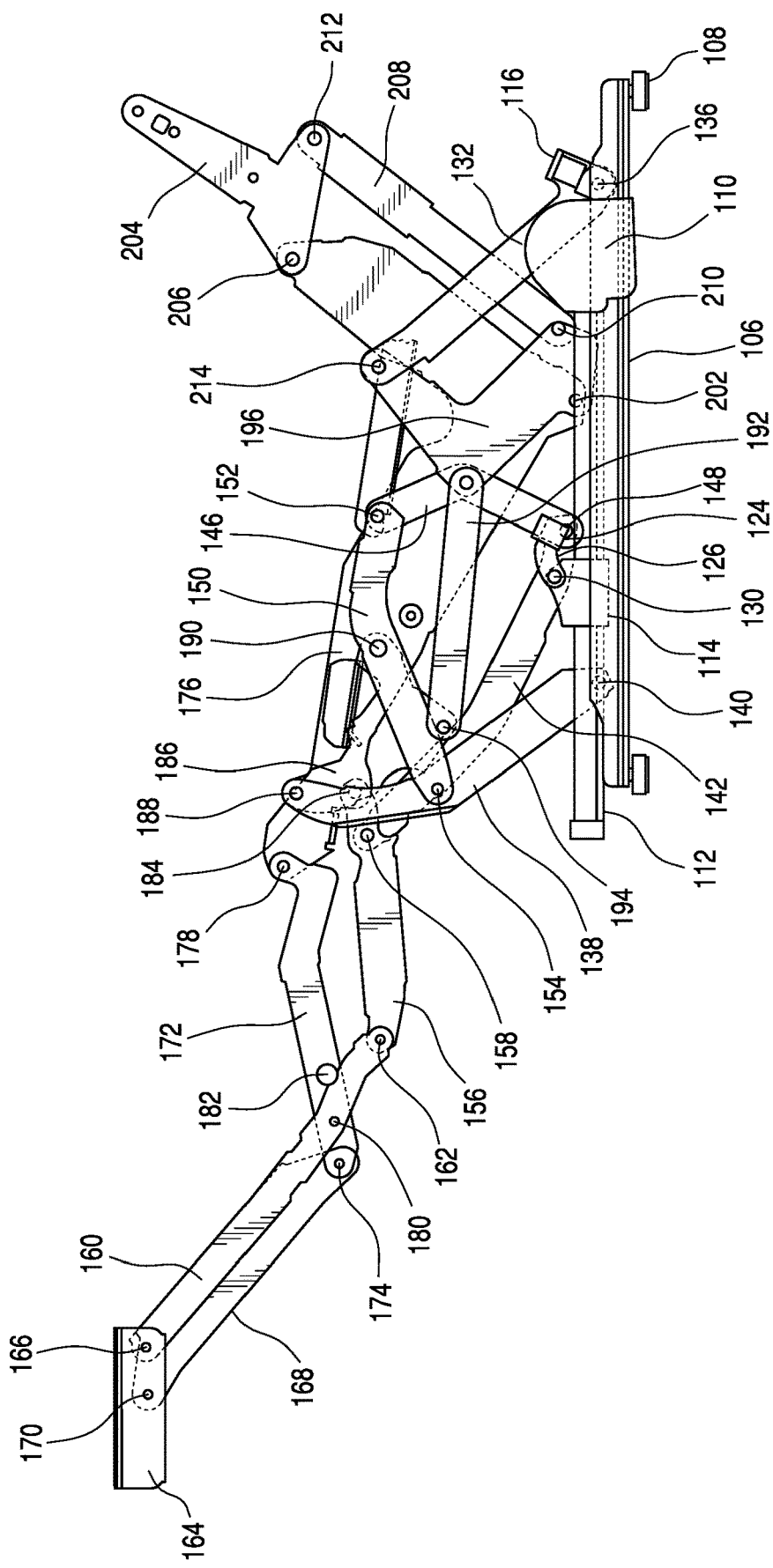
FIG. 2 is a schematic side elevational view, similar to that of FIG. 1, showing a partially open position at which the footrest has been moved to an extended position and the backrest is disposed in an upright position.
Figure 3:
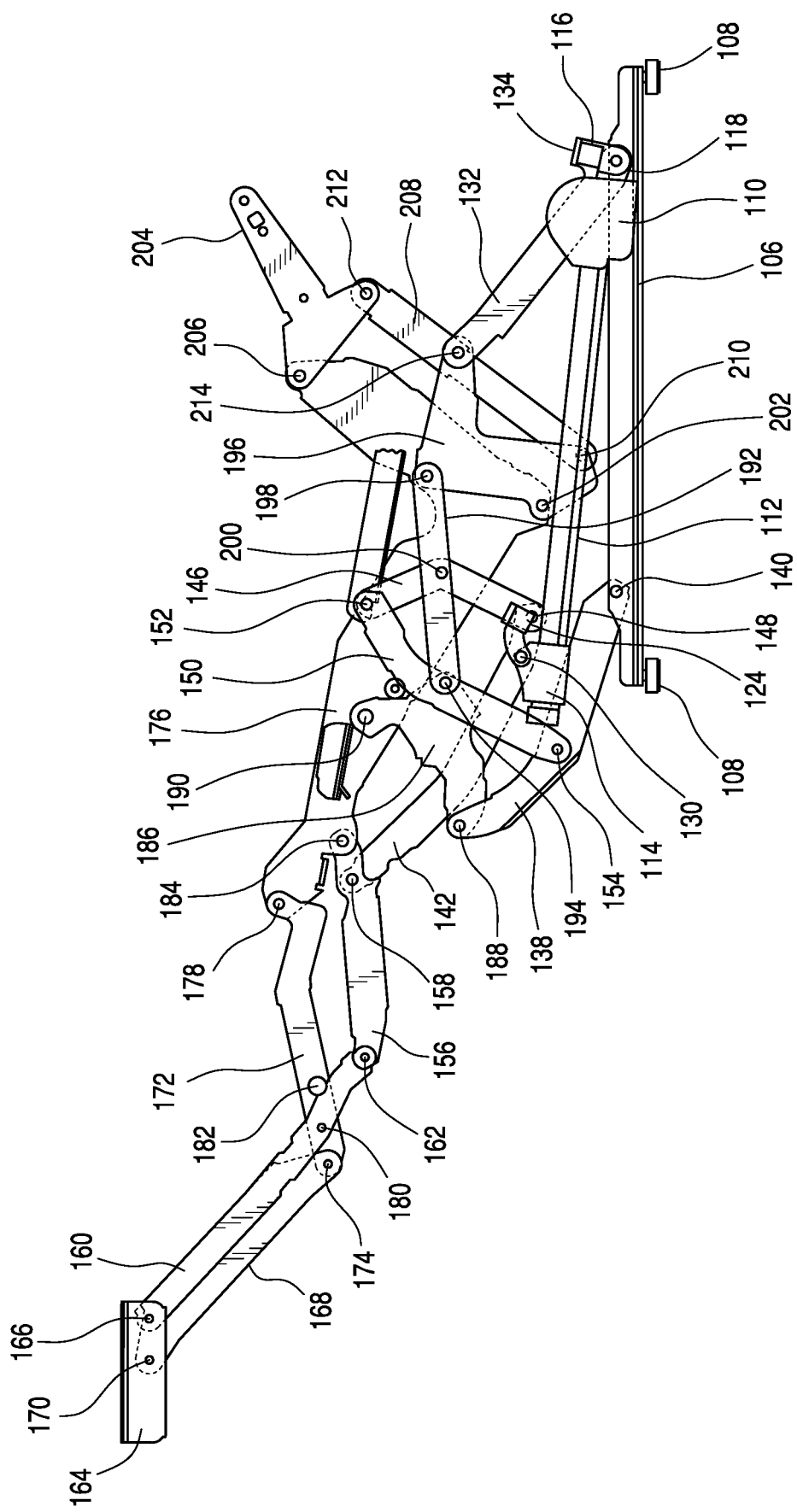
FIG. 3 is a schematic side elevational view, similar to that of FIGS. 1 and 2, showing a completely open position at which the footrest has been moved to an extended position and the backrest has been disposed at a reclined position.
Figure 4:
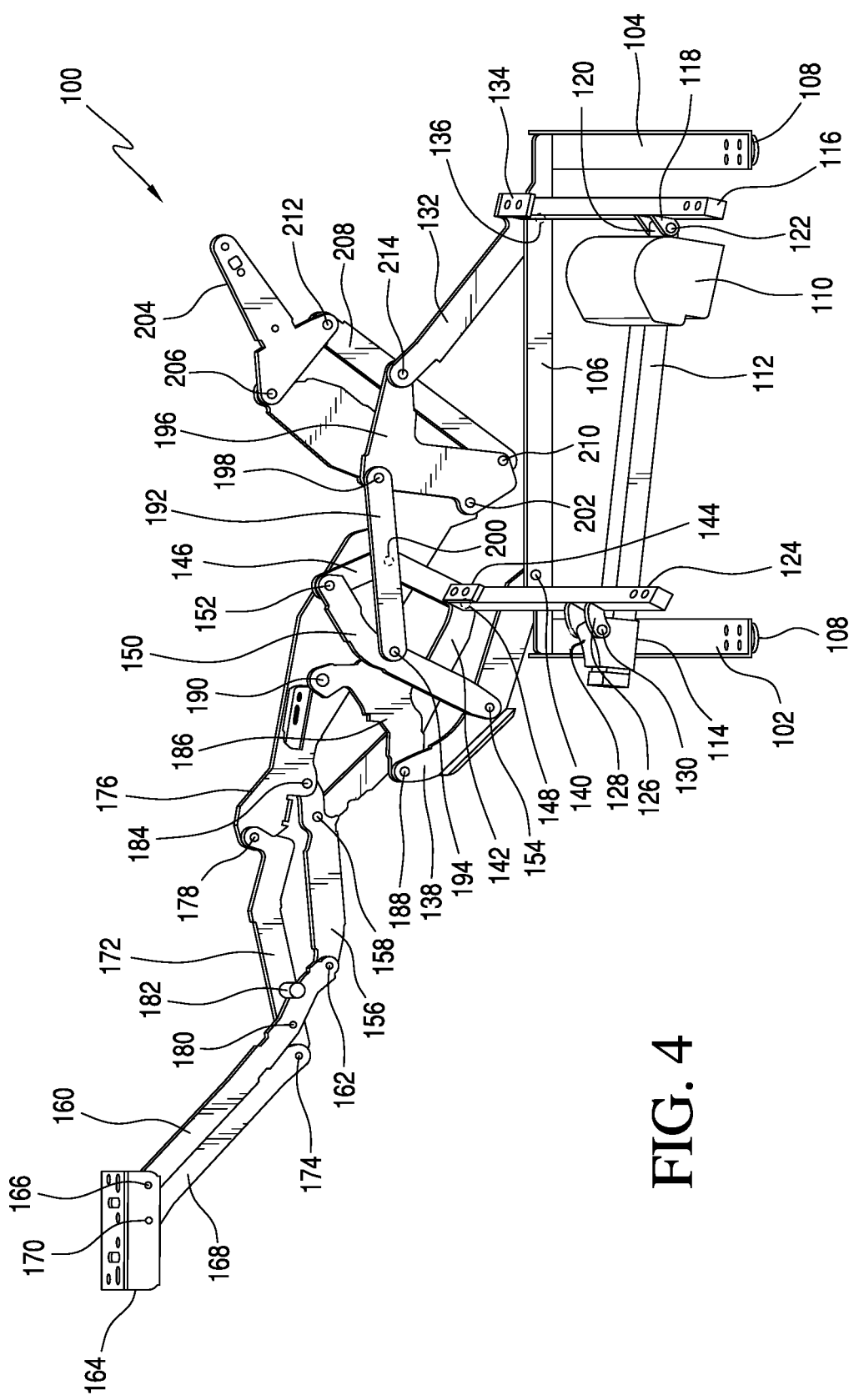
FIG. 4 is a perspective elevational view similar to that of FIG. 3.

Referring now to the drawings, and more particularly to FIGS. 1-4 thereof, a motorized multi-position recliner chair mechanism is illustrated and is generally indicated by the reference character 100. FIG. 4 is a perspective view of, for example, the right half side of the chair mechanism 100, it therefore being understood and noted further that an opposite mirror image of the chair mechanism components illustrated within FIG. 4 would comprise the left half side of the chair mechanism 100 so as to in fact comprise the entire operative chair mechanism 100.

As can be best seen from FIG. 4, the motorized multi-position recliner chair mechanism 100 is seen to comprise four base rails, only three of which are illustrated at 102, 104, 106, wherein the four base rails 102 are disposed within a substantially rectangular array and are supported upon a ground or floor surface, not shown, by means of downwardly projecting feet or leg members 108. For convenience, the three visible base rails 102, 104, 106 will be referred to hereinafter as the forward base rail member 102, the rearward base rail member 104, and the right side base rail member 106.

In addition, it is further seen that the chair mechanism 100 comprises a drive motor 110 which has a drive or linear motor actuator 112 operatively associated therewith. The drive or linear motor actuator 112 can comprise a cylindrical screw having rotary threads formed thereon so as to operatively cooperate and drive an actuator drive block 114 forwardly and rearwardly along the actuator 112 as the drive motor 110 rotates the drive motor actuator 112, the actuator drive block 114 having cooperating threads disposed internally thereof. Other linear actuators, such as, for example, the linear actuator disclosed within U.S. Pat. No. 8,398,165 which issued to Lawson on Mar. 19, 2013, as well as the linear actuator disclosed within U.S. Pat. No. 8,573,687 which issued to Lawson et al. on Nov. 5, 2013, can likewise be utilized. It is further seen that the drive motor 110 is pivotally mounted upon, and connected to, a transversely oriented rear motor mounting tube 116 by means of a clevis-type rear motor mounting bracket 118, wherein a lug 120 projects outwardly from the drive motor 110 and is pivotally connected to the mounting bracket 118 by means of a pivot pin connection 122. In a similar manner, it is likewise seen that the actuator drive block 114 is pivotally mounted upon, and connected to, a transversely oriented front actuator drive block mounting tube 124 by means of a clevis-type front actuator drive block mounting bracket 126, wherein a lug 128 projects outwardly from an upper surface portion of the actuator drive block 114 and is pivotally connected to the mounting bracket 126 by means of a pivot pin connection 130.

With reference continuing to be made to FIG. 4, it is further seen that the right end portion of the transversely oriented rear motor mounting tube 116 is fixedly connected to a right rear pivot link 132 by means of a corner mounting bracket 134. The left end, not illustrated, of the rear mount tube 116 is likewise fixedly connected to a corresponding, oppositely disposed rear pivot link, also not illustrated. In this manner, a first integrally fixed unit is effectively formed by means of the rear motor mounting bracket 118, the rear motor mount tube 116, and the right rear pivot link 132.

Figure 1:
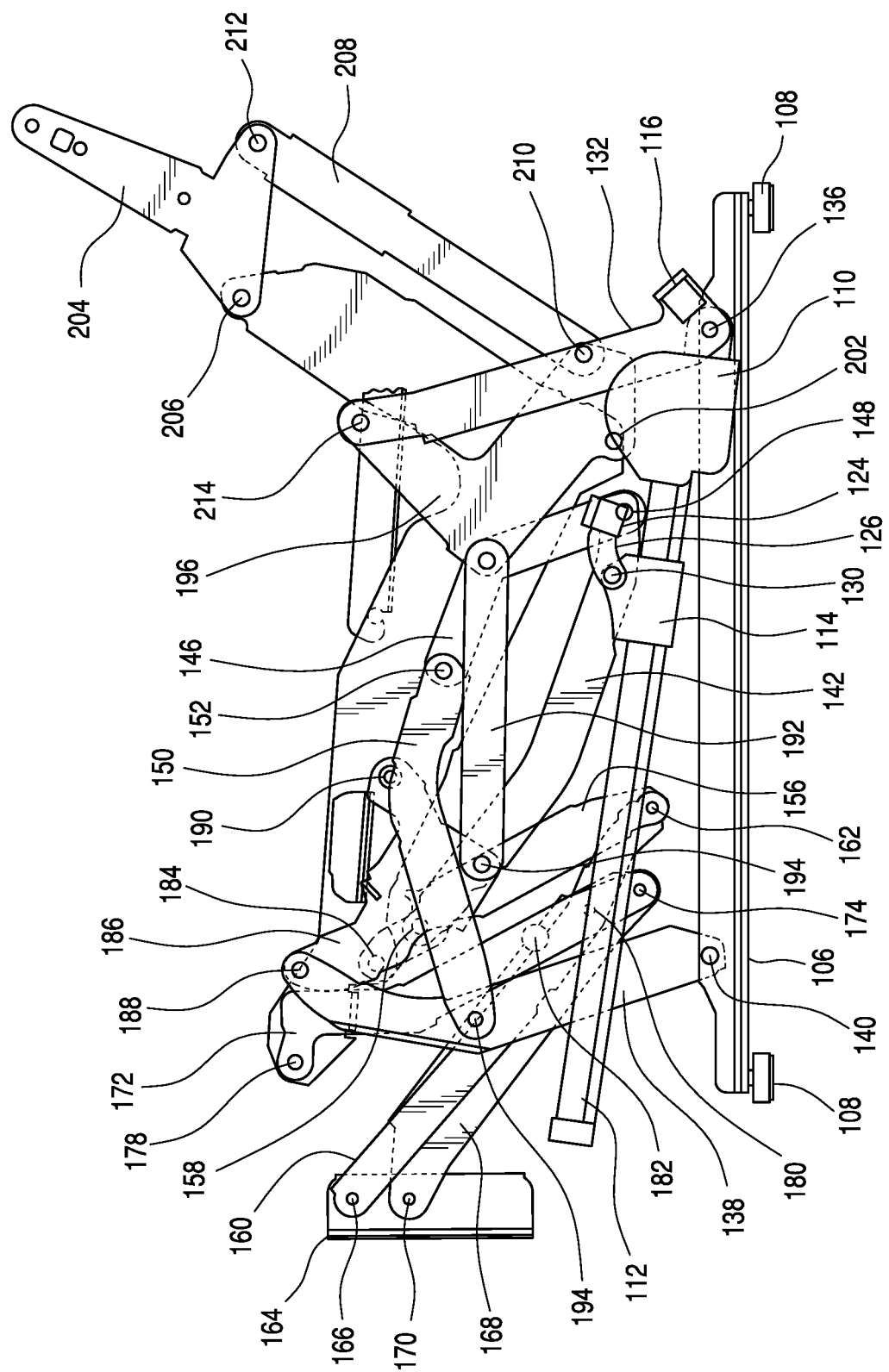
FIG. 1 is a schematic side elevational view of the right side half of a first embodiment of a motorized multi-position recliner chair mechanism in accordance with the first embodiment, wherein the chair is disposed at its normally closed, original, upright position.

The right rear pivot link 132 is, in turn, pivotally connected at the lower end portion thereof to the right side base rail member 106 by means of a pivot pin 136, which can best be seen in FIGS. 1-3, and it is to be understood and appreciated further that the pivot pins 122 and 136 are coaxially disposed with respect to each other. In this manner, or as a result of this construction of this portion of the chair mechanism 100, it can be appreciated that the drive motor 110 is effectively positionally fixed, or at least positionally constrained, with respect to the base rail assembly comprising the base rail members 102, 104, 106, such that the drive motor 110 does not undergo any significant positional movement relative to the base rail assembly, other than some pivotal movement as permitted by means of the pivot pin assembly 118, 120, 122 as will be necessary when the various components of the chair mechanism linkage system are actuated, as will be more fully explained hereinafter. Furthermore, this structural relationship impedes asymmetrical moments from being developed when the drive motor 110 undergoes pivotal movements whereby, otherwise, such asymmetrical moments may act upon or be transferred to the various linkage components and the base rails 102, 104, 106, possibly rendering the chair mechanism 100 unstable. Accordingly, this positional constraint and limited movement of the drive motor 110 with respect to the base assembly provides enhanced stability for the recliner chair.

In a similar manner, and as will also be more fully discussed hereinafter, chair mechanism 100 likewise comprises a right front pivot link 138, wherein the lower end portion of the right front pivot link 138 is pivotally connected to the right side base rail member 106 by means of a pivot pin 140 which can best be seen in FIGS. 1-3. Still yet further, and in a manner similar to the fixed connection that was defined between the rear pivot link 132 and the rear motor mounting tube 116 by means of the corner bracket 134, it is likewise seen that the lower end portion of a footrest drive link 142 is fixedly connected to the right end portion of the front actuator drive block mounting tube 124 by means of a corner mounting bracket 144. In this manner, a second integrally fixed unit is effectively formed by means of the front actuator drive block mounting bracket 126, the front actuator drive block mounting tube 116, and the footrest drive link 142. In addition, it is also seen that the lower end portion of a pivot link 146 is pivotally connected to the lower end portion of the footrest drive link 142 by means of a pivot pin 148 which can best be seen in FIGS. 1-3. In turn, the upper end portion of the pivot link 146 is pivotally connected to a first end portion of a drive control link 150 by means of a pivot pin 152, while a second opposite end portion of the drive control link 150 is pivotally connected to an intermediate section of the right side front pivot link 138 by means of a pivot pin 154.

It will also be seen that the upper end portion of the footrest drive link 142 is pivotally connected to an intermediate portion of a first footrest actuating link 156 by means of a pivot pin 158, while a first end portion of the first footrest actuating link 156 is pivotally connected to a first end portion of a second footrest actuating link 160 by means of a pivot pin 162. The second opposite end portion of the second footrest actuating link 160 is pivotally connected to a rear portion of a footrest mounting bracket 164 by means of a pivot pin 166, while it is additionally seen that a first end portion of a third footrest actuating link 168 is pivotally attached to an intermediate portion of the footrest mounting bracket 164 by means of a pivot pin 170. The second opposite end portion of the third footrest actuating link 168 is seen to be pivotally connected to a first end portion of a fourth footrest actuating link 172 by means of a pivot pin 174, and the second opposite end portion of the fourth footrest actuating link 172 is pivotally connected to a right side seat rail 176 by means of a pivot pin 178. It is also noted that an intermediate portion of the fourth footrest actuating link 172 is pivotally connected to an intermediate portion of the second footrest actuating link 160 by means of a pivot pin 180, for a purpose that will be discussed more fully hereinafter, and it is also seen that the fourth footrest actuating link 172 is also provided with a contact stop 182 for a purpose which will likewise be discussed more fully hereinafter. Lastly, with respect to the footrest actuating links 156, 160, 168, and 172, it is seen that a second opposite end portion of the first footrest actuating link 156 is pivotally connected to the right side seat rail 176 by means of a pivot pin 184.

Continuing further, it is seen that the upper end portion of the right side front pivot link 138 is pivotally connected to a first corner region of a substantially triangular-shaped recline control link 186 by means of a first pivot pin 188, while a second corner region of the recline control link 186 is pivotally connected to the seat rail 176 by means of a second pivot pin 190. Still yet further, a third corner region of the recline control link 186 is pivotally connected to a first end portion of a recline connector link 192 by means of a third pivot pin 194, while a second opposite end portion of the recline connector link 192 is pivotally connected to a first region of a recline pivot link 196, which has a substantially inverted L-shaped configuration, by means of a first pivot pin 198. Within this region of the mechanism linkage system, it can also be seen that an intermediate portion of the pivot link 146 is pivotally connected to a substantially central portion of the seat rail 176 by means of a pivot pin 200 which can best be seen in FIG. 3. Reverting back to the substantially inverted L-shaped recline pivot link 196, it is further seen that a first lower portion of the recline pivot link 196 is pivotally connected to a lower portion of the seat rail 176 by means of a second pivot pin 202, while an upper rear portion of the seat rail 176 has a first corner portion of a seatback support or mounting bracket 204 pivotally mounted thereon by means of a pivot pin 206. A second lower portion of the recline pivot link 196 has a first lower end portion of a backrest recline link 208 pivotally connected thereto by means of a third pivot pin 210, while the second opposite upper end portion of the seatback recline link 208 is pivotally connected to the seatback support or mounting bracket 204 by means of a pivot pin 212. It is lastly seen that an upper end portion of the right rear support link 132 is pivotally connected to the outwardly projecting portion of the substantially inverted L-shaped recline pivot link 196 by means of a fourth pivot pin 214.

Having now described substantially all of the operating components defining the recliner chair mechanism 100, a brief operation of the same, for quickly and smoothly moving the various components comprising the recliner chair, such as, for example, the footrest mounting bracket 164, upon which a chair footrest, not shown, will be mounted, as well as the backrest support or mounting bracket 204, upon which a chair backrest, also not shown, will likewise be mounted, between their closed (or retracted) positions to their fully open (or extended) positions, will now be described. It will be seen that the linkage system of the present invention mechanism will, in effect, comprise a first linkage system which moves the footrest from a closed position to an open position as a result of the linear movement of the actuator drive block from its original (or start) position to a first predetermined position along the drive motor actuator, and a second linkage system which moves the seatback from an upright position to an inclined position as a result of the linear movement of the actuator drive block still further along the drive motor actuator from the first predetermined position to the second predetermined position.

More particularly, with reference being made to FIG. 1, the motorized multi-position recliner chair mechanism 100 is disclosed at its retracted or closed position at which it can be seen that the drive motor 110 has been actuated such that the actuator drive block 114 is disposed at its rearward-most position. Accordingly, the footrest mounting bracket 164 is disposed at its closed position at which a footrest, not shown, mounted upon the footrest mounting bracket 164, will be disposed at its closed position at which the footrest will be disposed in a vertically downward orientation, while the backrest support or mounting bracket 204 will be disposed at its upright position. When it is desired to initially move the chair from its original, normally closed position to, for example, a TV position at which the footrest is moved from its vertically downward position to an elevated position as disclosed within FIG. 2, the motor drive 106 is actuated so as to move the actuator drive block 114 forwardly with respect to the drive motor actuator 112 to, for example, the disposition of the actuator drive block 114 as illustrated within FIG. 2. Accordingly, it can be seen that as the actuator drive block 114 moves forwardly along the drive motor actuator 112, the footrest drive link 142 is correspondingly moved forwardly as a result of the first fixed integral unit defined by or between the actuator drive block 114, the actuator drive block lug 128, the front motor mounting bracket 126, the front actuator drive block mounting tube 124, and the footrest drive link 142 fixedly secured to the front actuator drive block mounting tube 124 by means of the corner bracket 144. Still further, appreciating the fact that the forward end portion of the footrest drive link 142 is pivotally connected to the first footrest actuating link 156, the first footrest actuating link 156 will move in a clockwise direction from its position illustrated within FIG. 1 to its position illustrated within FIG. 2 as a result of pivotal movement around pivot pin 184 which pivotally secures the first drive control link 142 to the seat rail 176. In turn, the second footrest actuating link 160 is moved forwardly or extended from its position illustrated within FIG. 1 to its position illustrated within FIG. 2 as a result of its pivotal connection, at its first end portion, to the first footrest actuating link 156 by means of pivot pin 162.

Recalling that the second opposite end portion of the second footrest actuating link 160 is pivotally connected to the footrest mounting bracket 164 by means of pivot pin 166, the footrest mounting bracket 164 is moved toward its forwardmost elevated and horizontally oriented disposition as a result of the pivotal connection defined between the footrest mounting bracket 164 and the third footrest actuating link 168. It will also be recalled that an intermediate portion of the second footrest actuating link 160 is pivotally connected to the fourth footrest actuating link 172, which is not only pivotally connected at one end portion thereof to the seat rail 176 by means of pivot pin 178, but the fourth footrest actuating link 172 is also pivotally attached at its opposite end portion to the third footrest actuating link 168 by means of pivot pin 174. Accordingly, as the fourth footrest actuating link 172 is moved forwardly as a result of the forward movement of the second footrest actuating link 160, the fourth footrest actuating link 172 will effectively cause the third footrest actuating link 168 to move upwardly, thereby moving the footrest support bracket 164 to a horizontal orientation and to a predetermined elevational position relative to the base rails 102, 104, 106. This orientation is also effectively predetermined as a result of the predetermined spacing defined between the pivot pins 166 and 170. Still yet further, this actuating movement of the various linkage components continues until the stop member 182, disposed upon the fourth footrest actuating link 174, encounters the second footrest actuating link 160. As the footrest support bracket 164 is moving forwardly relative to the base rails 102, 104, 106 by means of the aforenoted linkage connections, the seat rail 176 is also being moved forwardly so as to achieve the desired zerowall functional operation of the recliner chair.

More particularly, it will be recalled that the pivot link 146 is pivotally connected to the footrest drive link 142 by means of the pivot pin 148 which can best be seen in FIG. 1. In addition, it will also be recalled that the pivot link 146 is pivotally connected to the seat rail 176 by means of the pivot pin 200. Accordingly, as the footrest drive link 142 is moved forwardly, the seat rail 176 will be moved forwardly as a result of its pivotal connection to the pivot link 146 which, in turn, is pivotally connected at its lower end portion to the footrest drive link 142 as at 148, however, the pivot link 146 will also pivot or rotate in the clockwise direction around pivot pin 200, pivotally connecting the pivot link 146 to the seat rail 176, causing the second control drive link 150 to rotate in a clockwise direction. Since the upper end portion of the pivot link 146 is also pivotally connected to one end portion of the second drive control link 150 by means of pivot pin 152, while the second opposite end portion of the second drive control link 150 is pivotally connected to an intermediate portion of the right side front pivot link 138 by means of pivot pin 154, it can therefore be appreciated that the right side front support link 150 effectively moves in a counterclockwise direction with respect to the base rails 102, 104, 106. It is to be noted that the chair mechanism 100 is supported by means of the front pivot links 138, only the right side front pivot link 138 being illustrated, as well as by means of the rear pivot links 132, only the right side rear support link 132 being illustrated.

When the recliner chair is moved from the TV position illustrated in FIG. 2, to the fully reclined position illustrated in FIG. 3, and therefore with reference now being made to FIG. 3, it is noted that the actuator drive block 114 has now been moved to its forwardmost position. Accordingly, the right side pivot link 138 has been rotated still further in the counterclockwise direction, and therefore it is seen that such rotation of the right side pivot link 138 causes the counterclockwise rotation of the recline control link 186 relative to the seat rail 176 as a result of the pivotal connection of the recline control link 186 to the seat rail 176 by means of pivot pin 190. It will be recalled that one end portion, that is, the left end portion, of the recline connector link 192 is pivotally connected to the recline control link 186, while the opposite or right end portion of the recline connector link 192 is pivotally connected to the recline pivot link 196. Therefore, as the recline control link 186 rotates or pivots in a counterclockwise direction, the recline connector link 192 will effectively be moved toward the right or rearwardly. Such rightward or rearward movement of the recline connector link 192 will, in turn, cause clockwise rotation of the recline pivot link 196 around pivot pin 202 that pivotally connects the recline pivot link 196 to the seat rail 176. Rotational movement of the recline pivot link 196, in turn, results in the downward movement of the backrest recline link 208 as a result of the pivotal connection of the lower end portion of the backrest recline link 208 to the recline pivot link 196 by means of pivot pin 210. The downward movement of the backrest recline link 208 therefore causes the seatback support or mounting bracket 204 to be rotated in a clockwise direction relative to the seat rail 176, around pivot pin 206, as a result of the pivotal connection defined between the seatback recline link 208 and the seatback support or mounting bracket 204 by means of pivot pin 212. It is to be lastly understood that the driving of drive motor 110 in a reverse mode will effectively reverse all of the aforenoted movements of the various mechanism linkages such that the chair mechanism 100 can be moved and returned from its fully recline position, illustrated within FIGS. 3 and 4, to the intermediate and original positions respectively illustrated within FIGS. 2 and 1.

Exemplary Aspect with Motor Assembly Mounted to Rear Base Rail

Figure 5:
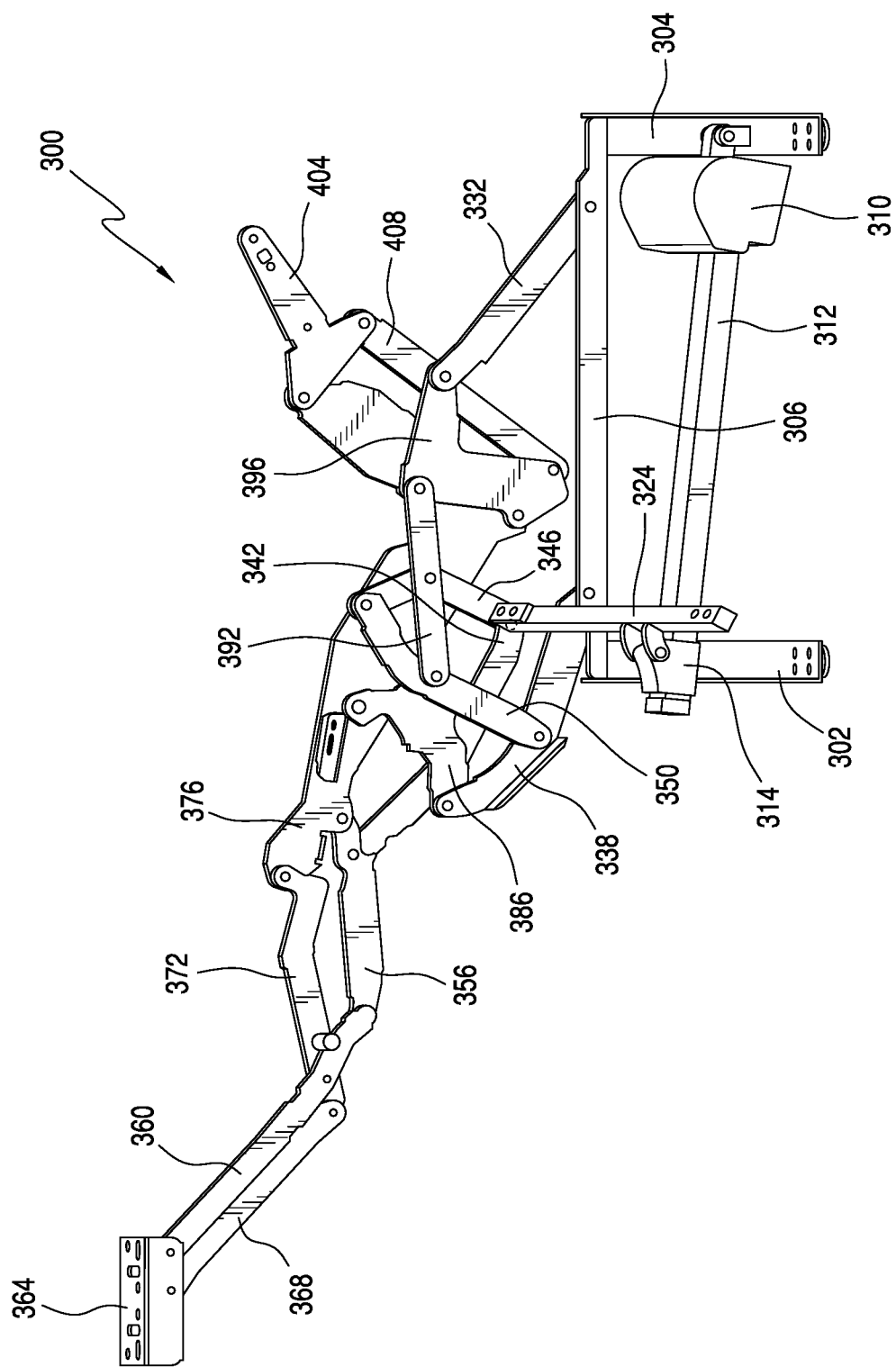
FIG. 5 is a perspective elevational view similar to that of FIG. 4 showing a second embodiment of the motorized multi-position recliner chair in accordance with the second embodiment.

With reference now being made to FIG. 5, another embodiment of a motorized multi-position recliner chair mechanism is disclosed and is generally indicated by the reference character 300. It is to be noted that component parts of the second embodiment chair mechanism illustrated within FIG. 5, that correspond to component parts of the first embodiment chair mechanism illustrated within FIG. 1, will be denoted by similar reference characters except that such reference characters will be in the 300 and 400 series. In addition, for brevity purposes, a description of those structural components which are common to both embodiments, and which are operationally similar, will not be discussed in detail, the description of the second embodiment illustrated within FIG. 5 being limited to the structural differences between the first and second embodiments.

More particularly, it can readily be seen that a difference of the chair mechanism 300 as illustrated within FIG. 5, when compared to the chair mechanism 100 disclosed within FIGS. 1-4, resides in the fact that the rear motor mounting tube has effectively been eliminated. As a result of this structural change, it is seen that in lieu of the drive motor 310 of the chair mechanism 300 being mounted upon the rear motor mounting tube, the drive motor 310 is pivotally attached directly to the rear base or floor rail 304. In addition, it is likewise seen that the right rear pivot link 332 is likewise connected directly to the right base rail 306.

Alternative Exemplary Aspect with Motor Assembly Mounted to Rear Base Rail

Figure 6:
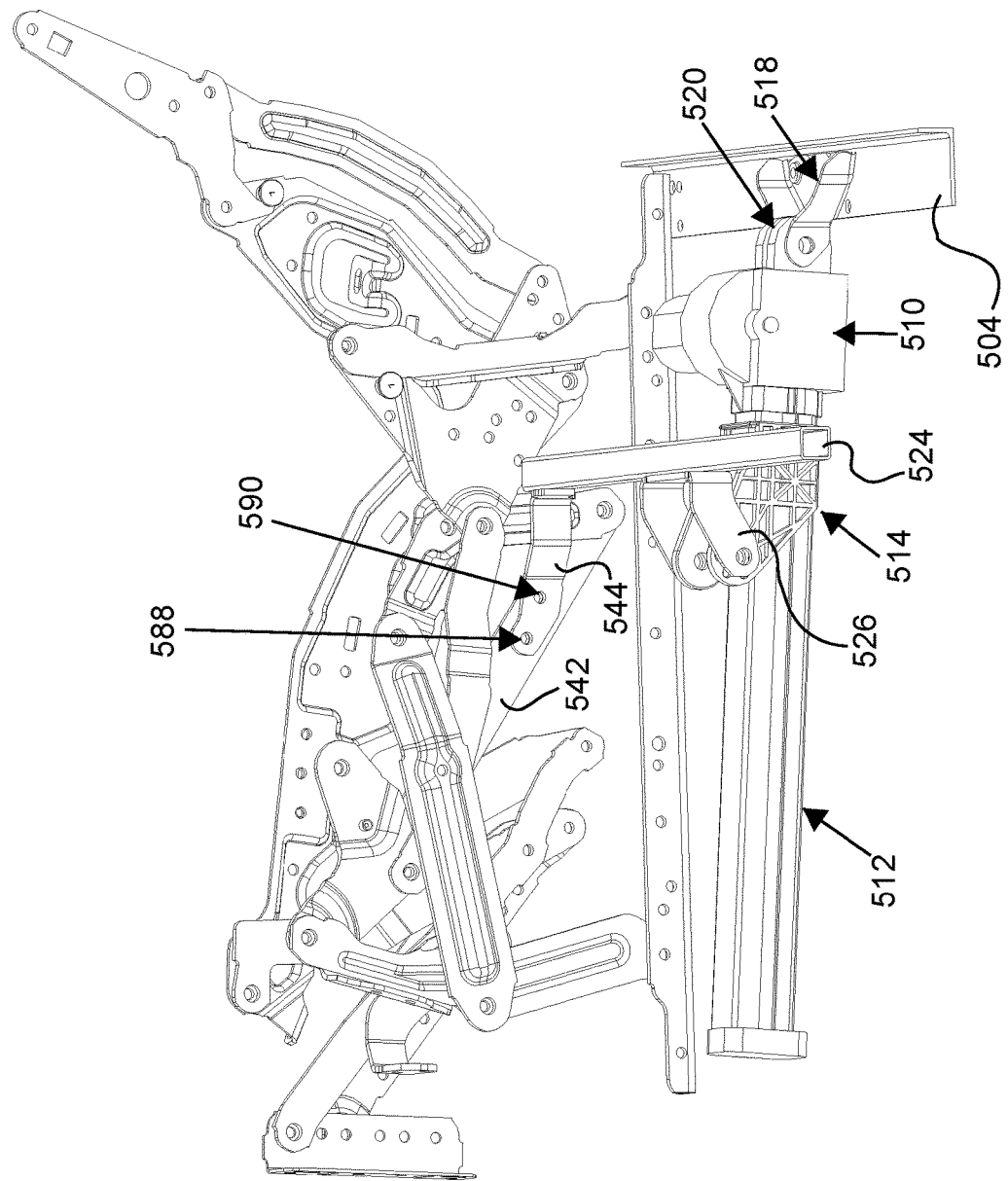
FIG. 6 illustrates a side top perspective of another linkage mechanism that is different from the mechanism in FIGS. 1-5, in accordance with an aspect of the present invention.
Figure 7:
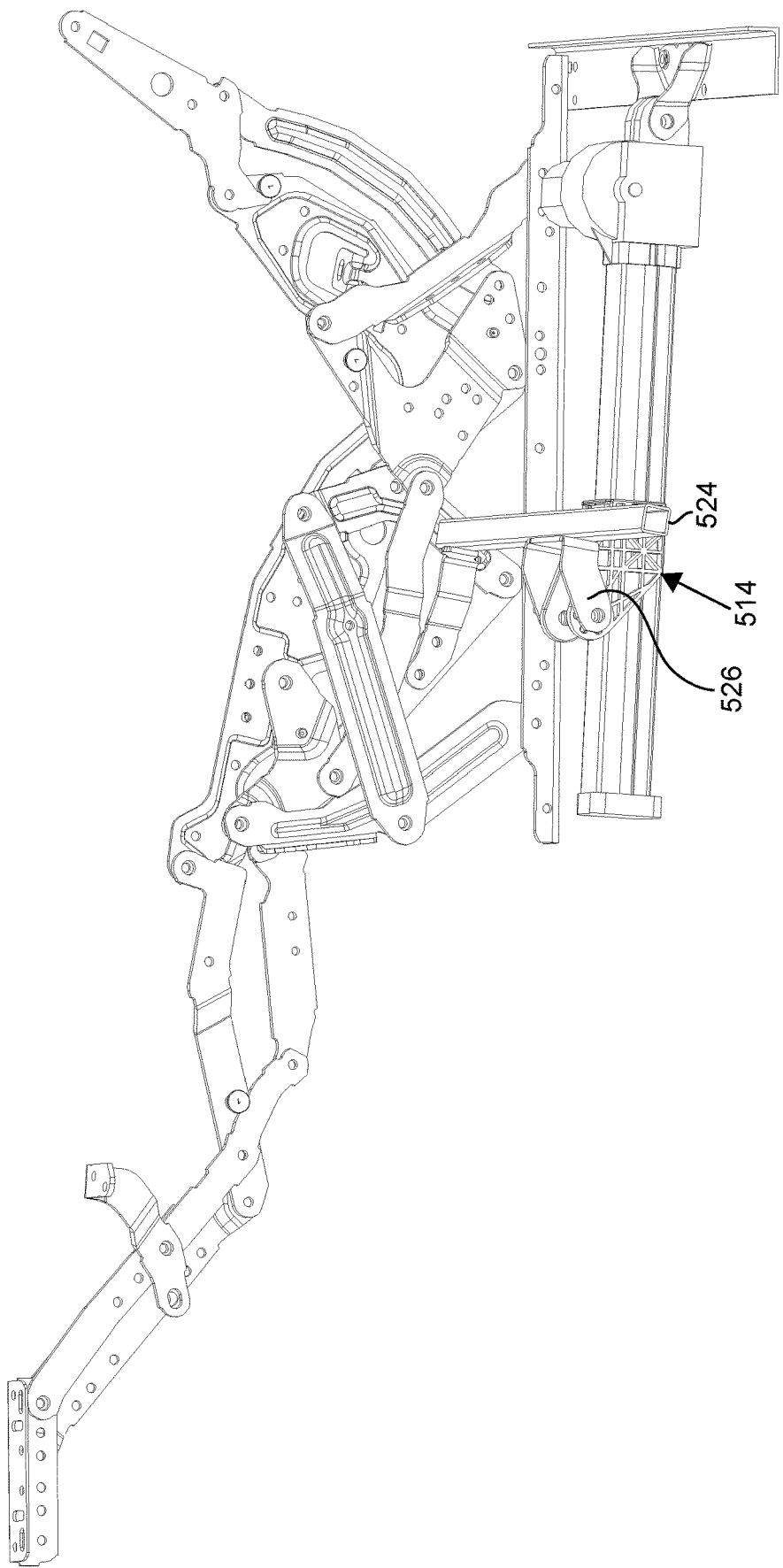
FIG. 7 illustrates a side top perspective of the linkage mechanism of FIG. 6 in a partially open configuration, in accordance with an aspect of the present invention.
Figure 8:
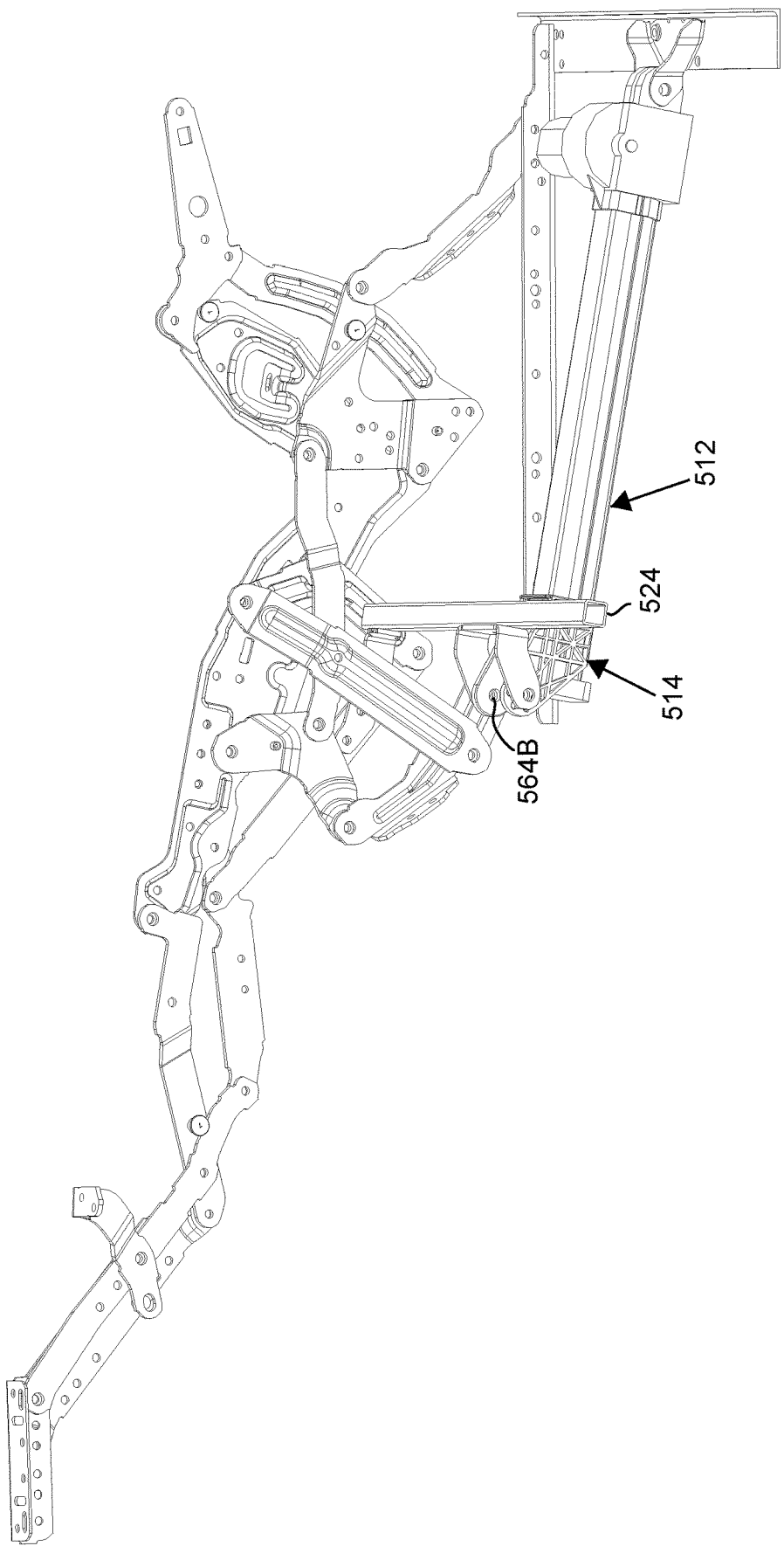
FIG. 8 illustrates a side top perspective of the linkage mechanism of FIGS. 6 and 7 in an open and reclined configuration, in accordance with an aspect of the present invention.

Referring now to FIGS. 6-8 and 9A-9C, another embodiment of the present invention is illustrated. FIGS. 6, 7, and 8 depict the mechanism in a closed position, TV position, and reclined position (respectively). In addition, FIGS. 9A-9C provide a more detailed illustrative view of the drive block 514 that is included in the mechanism of FIGS. 6, 7, and 8.

It is to be noted that many of the component parts of the third exemplary aspect of the mechanisms illustrated within FIGS. 6-8 are similar to the components illustrated in FIGS. 1-5. These component parts that are similar or that function in a similar manner, for brevity purposes, are not described in detail. Rather, the description of FIGS. 6-8 and 9A-9C will be directed to some of the differences included in the third exemplary aspect.

In FIGS. 6-8, similar to FIG. 5, the motor assembly attaches to a rear base rail 504 and to a front mounting tube 524. For example, a clevis-style bracket (e.g., lug) 520 extends from the motor housing. The clevis-style bracket 520 might be a separate bracket that is attached to the housing, or the clevis-style bracket 520 might be integrally formed (e.g., co-molded with) the rest of the motor housing. In addition, one or more rear motor-mounting brackets 518 are attached directly to the rear base rail 504.

The clevis-style bracket 520 and the rear motor-mounting bracket 518 are pivotably coupled to one another, such as by a clevis pin. To achieve desired positioning of the motor mechanism (e.g., motor drive 510, motor linear actuator 512, and drive block 514) the rear motor-mounting bracket 518 includes a leg extension that extends forward from the rear base rail 504 (i.e., forward towards a front base rail), such that the pivotable connection with the clevis-style bracket 520 is forward of the rear base rail 504.

In the aspect depicted in FIGS. 6-8, the front mounting tube 524 is attached to the footrest drive link 542 by way of a mounting bracket 544. The mounting bracket 544 and the footrest drive link are coupled by two mechanical fasteners (e.g., pins, screws, bolts, and the like) at fastener apertures 588 and 590, the two fasteners providing a non-rotating connection between the mounting bracket 544, the footrest drive link 542, and the front mounting tube 524.

The motor mechanism of FIGS. 6-8 includes an actuator drive block 514 that slidably traverses the linear actuator 512. A clevis-style attachment arrangement attaches the actuator drive block 514 to a mounting bracket 526, which is coupled to the front mounting tube 524. As compared with the actuator drive block 114 of FIGS. 1-5, the pivoting connection that attaches the drive block 514 to the mounting bracket 526 is located forward of the block 514, as will be described in more detail below.

Referring now to FIGS. 9A-9C, additional illustrative aspects of the drive block 514 are depicted. The drive block 514 includes a block body 550 that is configured to slidably traverse the linear actuator 512. For example, the block body 550 includes a top wall 552 and side walls 554A and 554B that at least partially enclose an actuator receiving space 556. Among other features, the actuator receiving space 556 may include a through hole 558 through which a cylindrical screw (or other actuator mechanism) may be threaded or otherwise inserted. In addition, the block body 550 includes a front end 560 that is oriented towards the front of the seating unit when the block 514 is affixed to the a motor assembly that is mounted to a front mounting tube, such as depicted in FIGS. 6-8.

The block body also includes a left mounting tab 562A and a right mounting tab 562B that extend from the front end 560 of the block body 550 and above the top wall 552. Each of the mounting tabs 562A and 562B includes a respective pin-receiving aperture 564A and 564B for receiving a pin that attaches the block 514 to the mounting bracket 526, which is affixed to the front mounting tube 524. The pin-receiving apertures 564A and 564B are positioned such that the pivoting connection between the motor block 514 and the mounting bracket 526 is both in front of the front end 560 and is above the top wall 560 (as well as above the linear actuator). Although the illustrative figures depict two mounting tabs, the mounting block might have a single mounting tab or more than two mounting tabs.

Referring to FIG. 9B, the pin-receiving apertures (e.g., 564A) are spaced a distance 566 from the front end 560 of the motor block 514. In one aspect of the disclosure, the distance 566 is in a range of about 30 mm to about 35 mm from the center axis of the aperture to the front edge of the block body. In a further aspect, the distance 566 is about 32 mm from the aperture center axis to the front edge.

The drive block 514 includes other features as well. For example, the pin-receiving apertures 564A and 564B are spaced a distance 568 above the center line of the through hole 558, in which a motor screw may be positioned. In one aspect of the disclosure, the distance 568 is in a range of about 33 mm to about 37 mm from the center line of the through hole 558 to the axis of the apertures 564A and 564B, and in a further aspect, the distance 568 is about 35 mm. When the block 514 is affixed to the mounting bracket 526, this forward position of the clevis pin, which results from distance 566, distance 568, or a combination of distances 566 and 568, helps to minimize the up and down rotation of the motor during movement of the mechanism through its positions depicted in FIGS. 6-8. Minimizing up and down movement of the mechanism can be helpful to avoid, or at least reduce, interference with other components of the seating unit (i.e., clearance issues). In addition, the forward position helps to reduce the overall length of the motor mechanism, since if the pivot attachment were positioned further rearward, or directly over the block, then the actuator 512 would need to be longer in order for the block 514, mounting bracket 526, and front mounting tube 524 to achieve the same forward position depicted in FIG. 8. This might result in a motor mechanism that is too long to fit within some chair mechanisms. As can be seen in FIG. 8, the overall length of the actuator 512 can be reduced or shortened because the forward position of the pin-receiving apertures (e.g., 564B in FIG. 8) allows the pivot connection to travel past the end of the actuator 512 at the end of the linear stroke.

As depicted, the drive block 514 includes a block width 570, including a distance between the outward-facing surfaces (e.g., 572A) of the left wall 554A and the right wall 554B. In one aspect of the disclosure, the distance 568 is in a range of about 50 mm to about 65 mm from the outward-facing surface 572A of the left wall 554A to the outward-facing surface (not viewable in FIGS. 9A-9C) of the right wall 554B, and in a further aspect, the width 570 is about 62 mm. As indicated above, the drive block 514 might include a single mounting tab, which would also include the width 570.

In some instances, the width 570 may directly affect the synchronization of the left linkage mechanism (not depicted) and the right linkage mechanism (e.g., 300), since a width that is too narrow may allow for the mounting tube 524 to skew as the motor block 514 traverses the actuator 512. That is, the sides of the mounting tube (e.g., right side or left side) may travel at different rates if the width 570 of the block 514 is too narrow and does not provide a sufficiently stable drive point. In this manner the width 570 that is in a range of about 50 mm to about 65 mm, and possibly about 62 mm, helps to maintain synchronization of the linkage mechanism.

Figure 10:
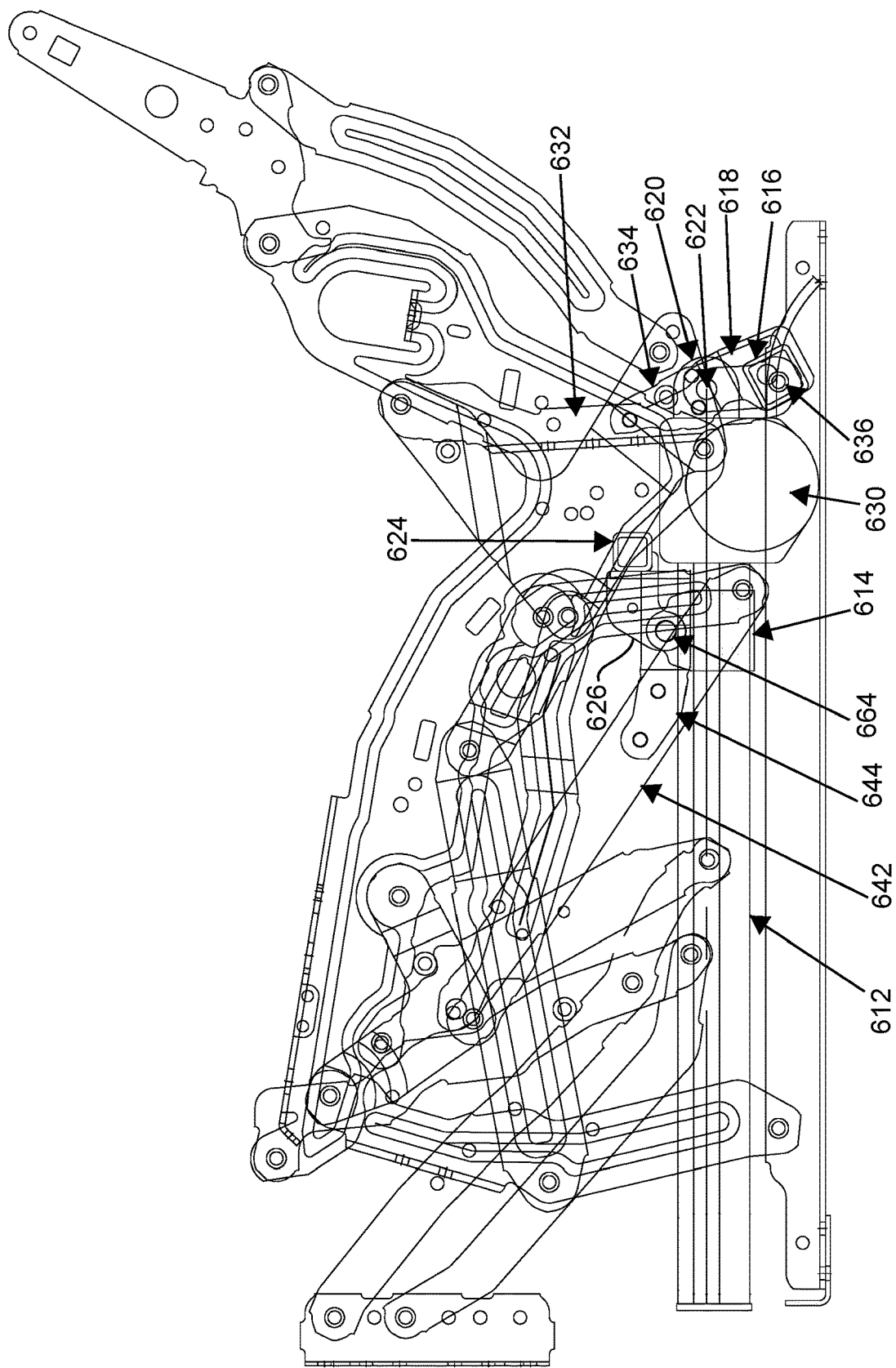
FIGS. 10, 11, and 12 depict a side view of another linkage mechanism that is different from the mechanism in FIGS. 1-5 and 6-8, such that FIGS. 10, 11, and 12 depict a closed configuration, a partially open configuration, and an reclined configuration.
Figure 11:
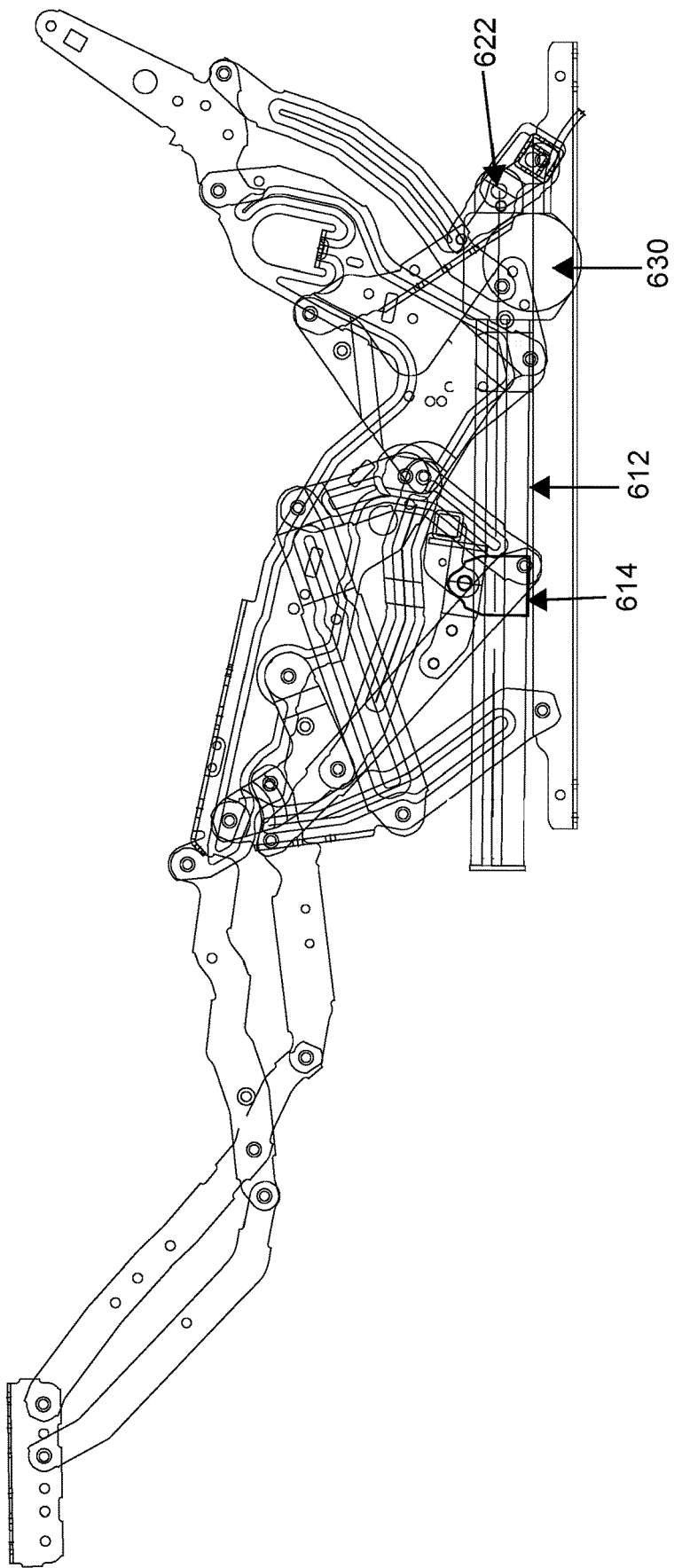
Figure 12:
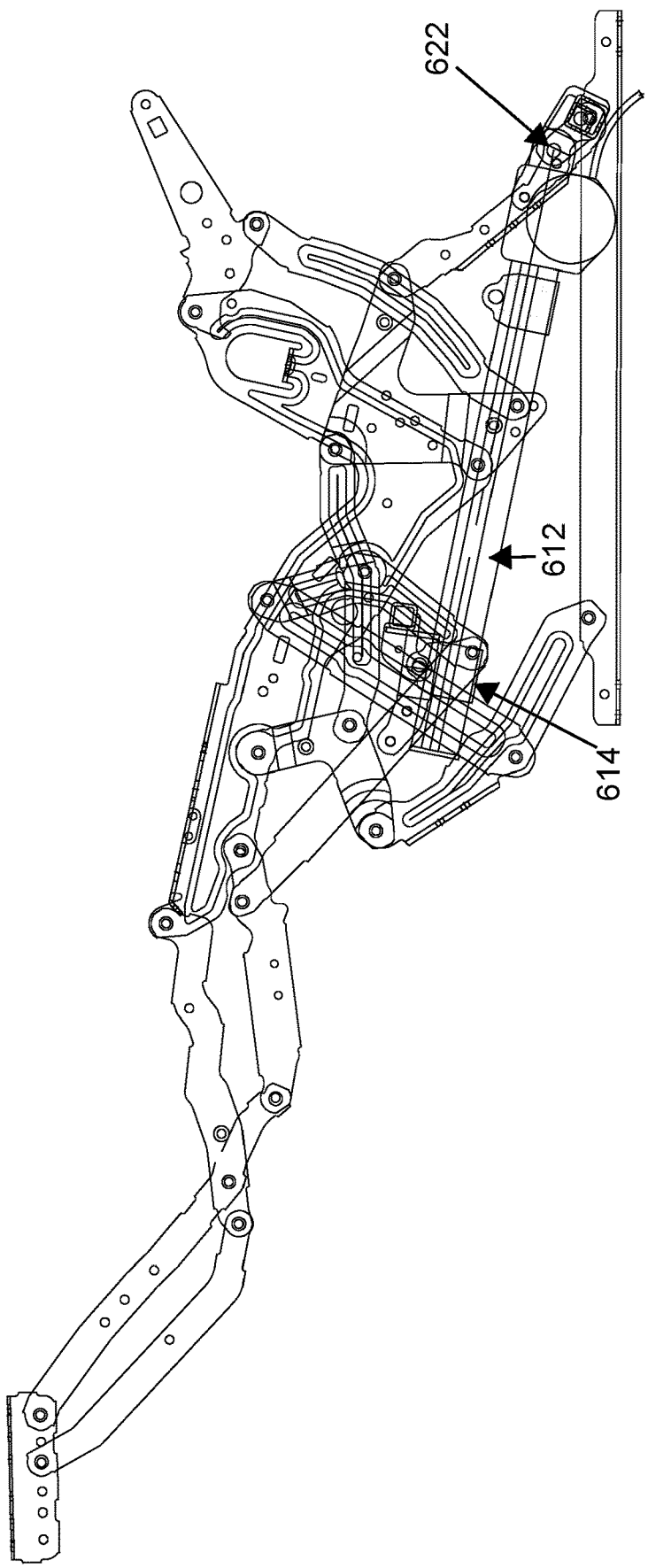
Figure 13:
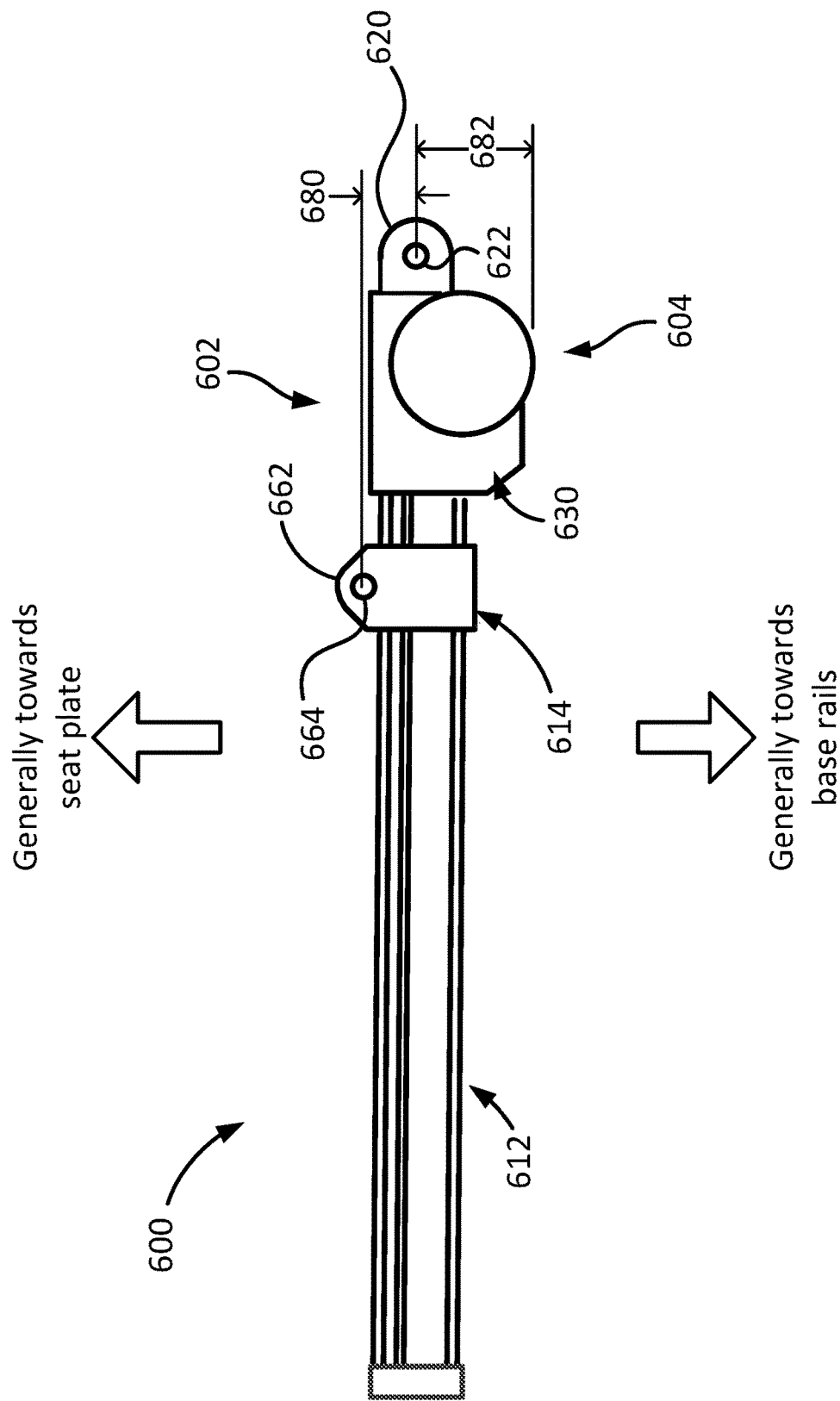
FIG. 13 depicts at least part of a motor assembly that is included in the mechanism depicted in FIGS. 10, 11, and 12, in accordance with an aspect of the present invention.

Alternative Exemplary Aspect with Motor Assembly Mounted to Rear Mounting Tube Referring now to FIGS. 10-13, another embodiment of the present invention is illustrated. FIGS. 10, 11, and 12 depict the mechanism in a closed position, TV position, and reclined position (respectively). In addition, FIG. 13 provides a more detailed illustrative view of the motor mechanism 600 that is included in the mechanism of FIGS. 10, 11, and 12.

It is to be noted that many of the component parts of the fourth exemplary aspect of the mechanisms illustrated within FIGS. 10-12 are similar to the components illustrated in FIGS. 1-8. These component parts that are similar or that function in a similar manner, for brevity purposes, are not described in detail. Rather, the description of FIGS. 10-13 will be directed to some of the differences included in the fourth exemplary aspect.

Similar to FIGS. 1-4, the motor mechanism 600 attaches to a rear mounting tube 616 and to a front mounting tube 624. For example, a clevis-style bracket (e.g., lug) 620 extends from the motor housing 630. As previously indicated, the clevis-style bracket 620 might be a separate bracket that is attached to the housing 630, or the clevis-style bracket 620 might be integrally formed (e.g., co-molded with) the rest of the motor housing 630. In addition, a rear motor-mounting bracket 618 is attached directly to the rear mounting tube 616. The clevis-style bracket 620 and the rear motor-mounting bracket 618 are pivotably coupled to one another, such as by a clevis pin passing through the pin-receiving aperture 622. In addition, the rear mounting tube 616 attaches to the rear pivot link 632 by way of a mounting bracket 634 in a non-rotating manner, such that the rear mounting tube 616 does not rotate relative to the rear pivot link 632. In addition, the motor 610 is effectively mounted above the lower pivot 636 of the rear pivot link based on the relative location of the pin-receiving aperture 622 connecting the clevis-style bracket 620 to the mounting bracket 618. That is, in FIG. 10 the pin-receiving aperture 622 is above the lower pivot 636 that attaches the rear pivot link to the base rail. The configuration of the various components, such as the clevis-style bracket 620, the rear motor-mounting bracket 618, and the mounting bracket 634 positions the pin-receiving aperture 622 a distance above the pivot connection 636. In aspect of the disclosure, the pin-receiving aperture 622 is located about 30 mm to about 40 mm higher than the pivot connection 636, and may be about 35 mm higher.

The motor mechanism of FIGS. 10-13 includes an actuator drive block 614 that slidably traverses the slide actuator 612. A clevis-style attachment arrangement is utilized to attach the actuator drive block 614 to a mounting bracket 626, which is coupled to the front mounting tube 624. As compared with the actuator drive block 514 of FIGS. 6-9, the clevis pin-receiving aperture 664 that attaches the actuator drive block 614 to the mounting bracket 626 is located directly above the block 614, as opposed to a forward orientation in front of the front edge of the drive block. In addition, the front mounting tube 624 non-rotatably attaches to a footrest drive link 642 by way of a mounting bracket 644, in the same manner as describe with respect to the mechanism of FIGS. 6-8.

As depicted in FIGS. 10-12, the motor 610 is attached in an upside-down orientation, relative to FIGS. 1-8, and this aspect is further illustrated in FIG. 13. That is, in FIGS. 10-12, the portion of the motor housing that is oriented downwards and facing towards the ground surface (not actually depicted) is oriented upward and toward the seat plates in FIGS. 1-8. In FIG. 13, the motor assembly includes a top side 602, which is generally oriented towards the direction of the seat plate of the seating mechanism when installed in a seating unit, and a bottom side 604, which is generally oriented towards and facing the direction of the ground surface or base rails. In addition, the drive block 614 includes one or more mounting tabs 662 that extend from the drive block 614 and in the direction towards the seat plates, the one or more mounting tabs 662 including the pin-receiving aperture 664 for attaching the drive block 614 to the mounting bracket 626. As depicted in FIG. 13, the motor mechanism 600 includes a distance 680 between a center line of the pin-receiving aperture 622 (of the lug 620) and a center line of the pin-receiving aperture 664. (The centerline of the pin-receiving aperture 622 may also be substantially aligned with the centerline of a motor screw threadably extending through the body of the drive blow 614.) In an aspect of the disclosure, the distance 680 is in a range of about 18 mm to about 22 mm, and may be about 20 mm. Moreover, the motor housing 630 extends from the bottom side of the motor assembly and in a direction opposite the mounting tabs 662 (i.e., towards the base rails), and the motor mechanism 600 includes a distance 682 between a lowermost surface of the motor housing 630 and the center line of the pin-receiving aperture 622 (of the lug 620). In an aspect of the disclosure, the distance 682 is in a range of about 52 mm to about 58 mm, and may be about 55 mm.

This orientation and the distances 680 and 682 may be helpful in chair-mechanism configurations in which the chair frame would otherwise have a difficult time clearing the motor 610, when attached to the rear base rail (as in FIGS. 6-8). By attaching the motor 610 above the lower pivot 636 of the rear pivot link 632 on the mechanism, the motor 610 moves forward as the mechanism opens from the closed position to the TV position and/or to the recline position, causing the motor 610 to move out of the way of the rear of the chair frame as the chair reclines. Further, mounting the motor mechanism 600 upside down locates the clevis-pin connection 622 higher, while positioning the motor housing 630 closer to the floor. This combination of orientations allows the motor mechanism 600 to fit between the rear pivot link 632 and a footrest board (not shown but would be attached vertically and slightly forward of the front base rail 602), and to still provide the necessary stroke to move the linkage mechanism through the desired positions. This configuration locates the motor in a limited area that provides frame clearance and floor clearance while allowing for a short enough motor length to fit within the confines of the chair.

Although not specifically illustrated, the drive block 614 may include a width that is similar to the width 570 and that helps to maintain substantial synchronization between the mechanisms. For example, a width of the drive block 614 may be between 50 mm and 65 mm, and may be 53 mm.

FIGS. 11 and 12 depict the seating mechanism in a TV position and reclined position, respectively, when the drive block 614 has traversed the actuator 612. Among other things, FIGS. 11 and 12 illustrate that the motor housing 630 traverses a relatively small distance as the mechanism transitions through its various positions, such as by considering the relatively small movement of the pin-receiving aperture 622. For example, in one aspect, the forward traversal of the motor housing from the closed position in FIG. 10 to the reclined position in FIG. 12 is in a range of about 18 mm to about 22 mm, and may be about 20 mm, which results in part from the rear pivot link rotating forward.

Other Aspects

This disclosure includes additional aspects, and when describing these additional aspects, reference may be made to one or more of the figures described in other portions of this disclosure. For example, a further aspect of the disclosure includes a motorized positioning apparatus for a seating unit, the apparatus including a set of base rails and a pair of seat plates that are coupled to one another by a pair of substantially mirror-image linkage assemblies. Each linkage assembly includes a footrest-linkage assembly including a plurality of footrest linkages that extend and retract a footrest mounting bracket and that include a footrest actuating link coupled to a respective seat plate. The motorized positioning apparatus also includes footrest drive links (e.g., 142, 342, 542, and 642) pivotably coupled to the footrest actuating link of each linkage assembly. In addition, a front mounting tube (e.g., 124, 324, 524, and 624) is attached to both footrest drive links. The front motor mounting tube may be driven using various motor assemblies, such as the motor assembly depicted in FIGS. 6-8 including the drive block 514 depicted in FIGS. 9A-9C. In addition, the front motor mounting tube may be driven by the motor assembly depicted in FIG. 13.

From the foregoing, it will be seen that aspects herein are well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made without departing from the scope thereof, it is to be understood that all matter herein set forth or shown in the accompanying drawings is to be interpreted as illustrative and not in a limiting sense.

The invention claimed is:

1. A motorized positioning apparatus for a seating unit, the apparatus comprising:
    a motor housing at least partially encasing a drive motor, the motor housing including a mounting bracket for attaching the motor housing to the seating unit;
    a linear actuator extending from the motor housing, the linear actuator including a set of one or more rails and a motor screw, the linear actuator including a front end opposing the motor housing;
    a drive block comprising a block body, the block body including one or more slots that slidably receive the set of one or more rails, the block body including a through hole for receiving the motor screw, the block body including a front terminal end oriented towards the front end of the linear actuator and oriented away from the motor housing, the drive block including one or more mounting tabs that include a pin-receiving aperture and that extend from the front terminal end and towards the front end of the linear actuator, such that a center axis of the pin-receiving aperture is positioned forward of the front terminal end, the one or more mounting tabs having a width in a range of about 50 mm to about 65 mm.

2. The motorized positioning apparatus of claim 1, wherein the mounting bracket is configured to attach the motorized positioning apparatus to a rear base rail of the seating unit.

3. The apparatus of claim 2, wherein the width is about 62 mm.

4. The motorized positioning apparatus of claim 1, wherein the drive block comprises a top wall over the one or more slots, and wherein the center axis is positioned above the top wall.

5. The motorized positioning apparatus of claim 4, wherein the mounting tabs extend continuously and uninterruptedly from the front terminal end and towards the front end of the linear actuator.

6. The motorized positioning apparatus of claim 4, wherein the pin-receiving aperture travels beyond the front end of the linear actuator when the drive block completes a forward travel in a direction towards the front end of the linear actuator and away from the motor housing.

* * * * *